Sept. 18, 1956 O. FIRING 2,763,051
MACHINE FOR MAKING FASTENER STRINGERS
Filed May 11, 1949 7 Sheets-Sheet 1

INVENTOR
Osborne Firing
BY
H. F. Johnston
ATTORNEY

Sept. 18, 1956  O. FIRING  2,763,051
MACHINE FOR MAKING FASTENER STRINGERS
Filed May 11, 1949  7 Sheets-Sheet 2

INVENTOR
Osborne Firing
BY
H. F. Johnston
ATTORNEY

INVENTOR
Osborne Firing
BY
H. F. Johnston
ATTORNEY

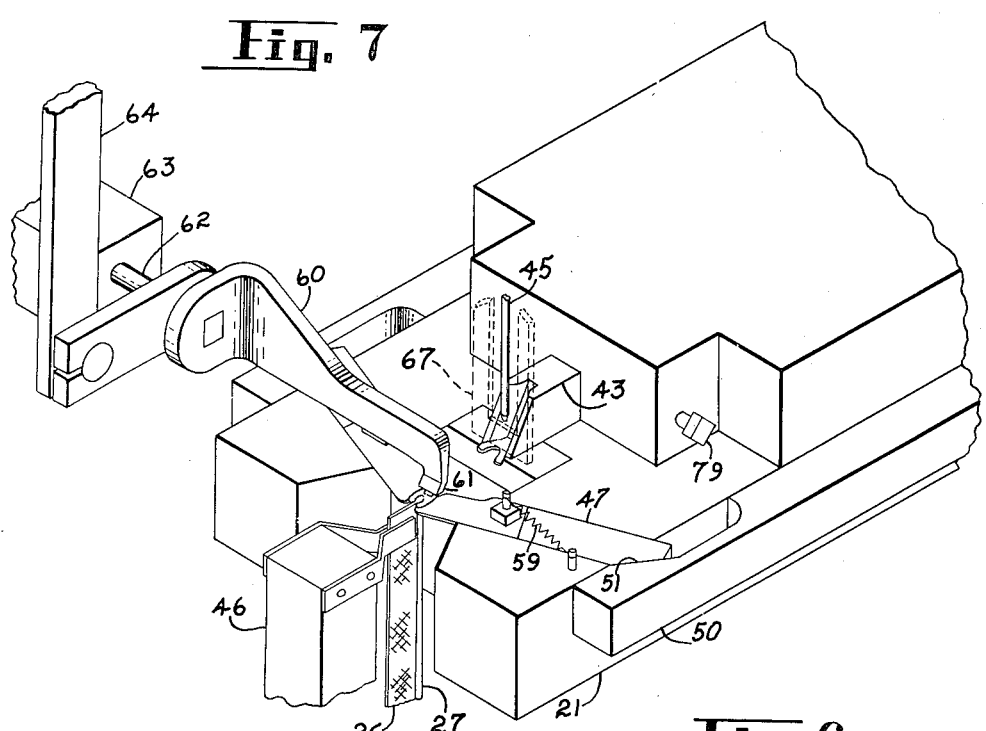
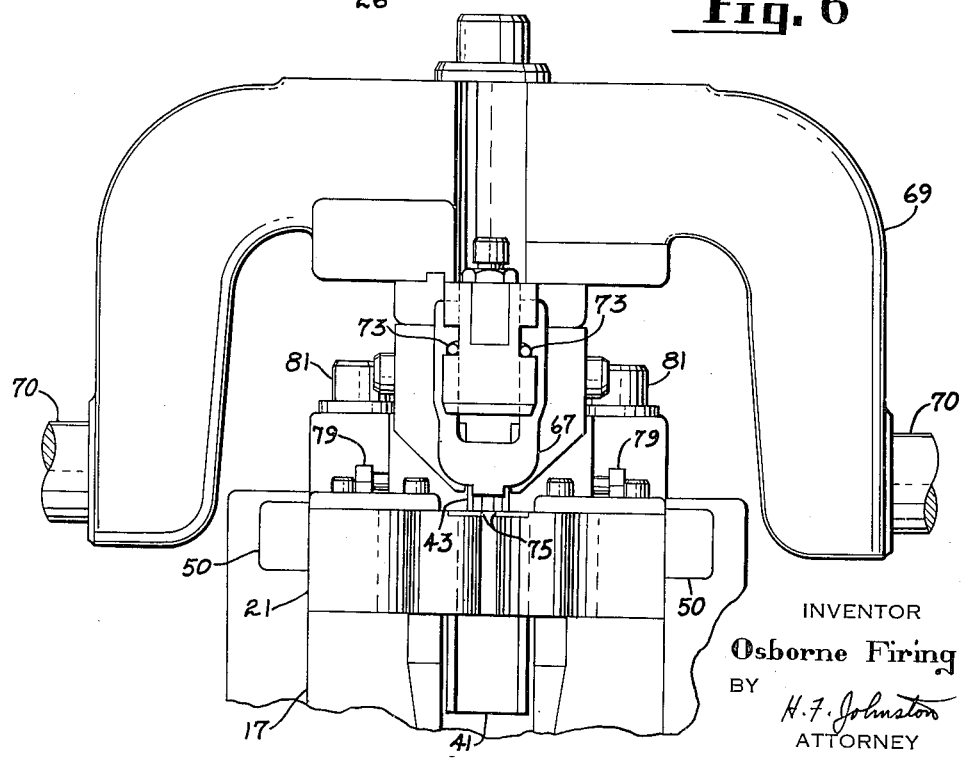

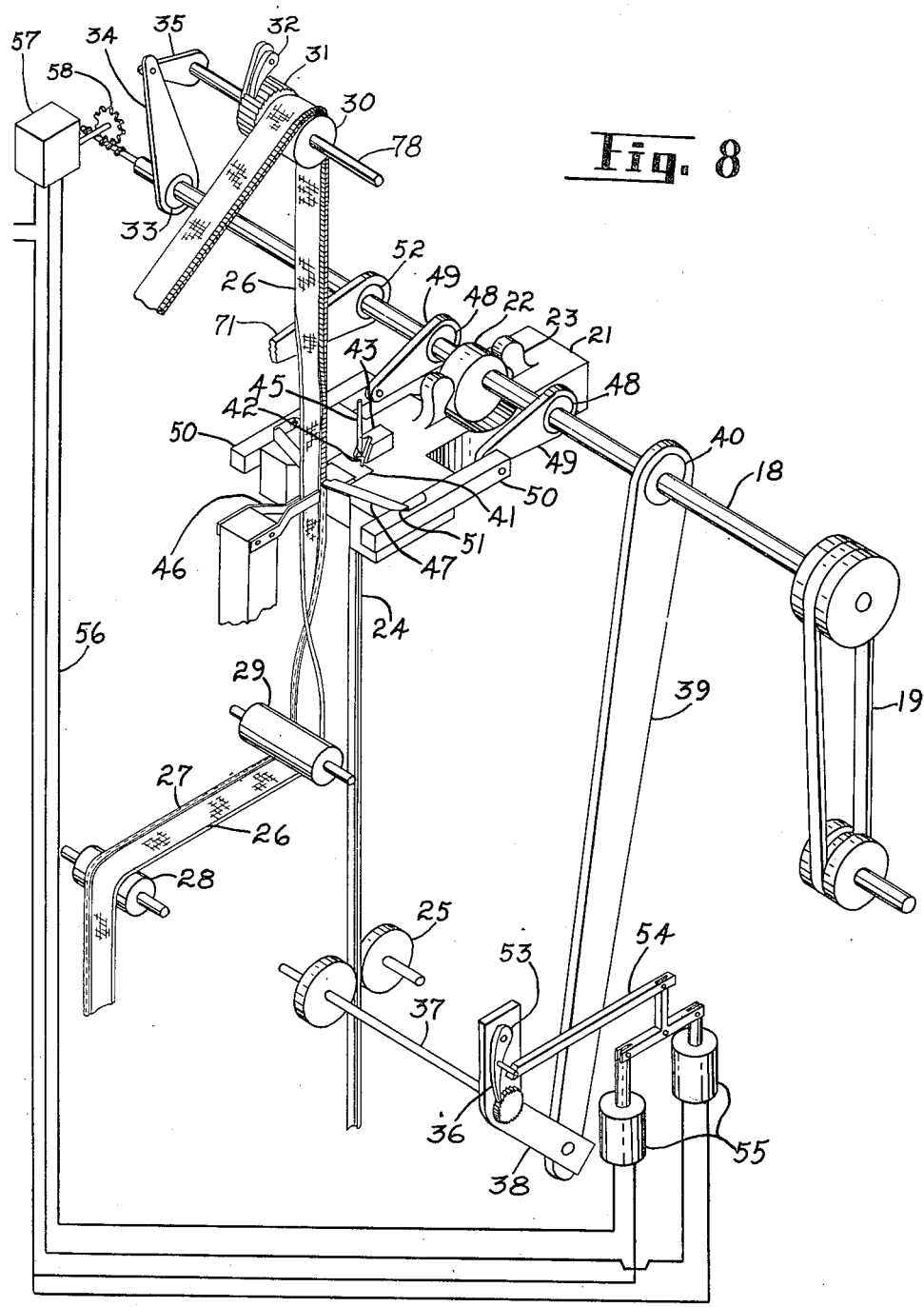

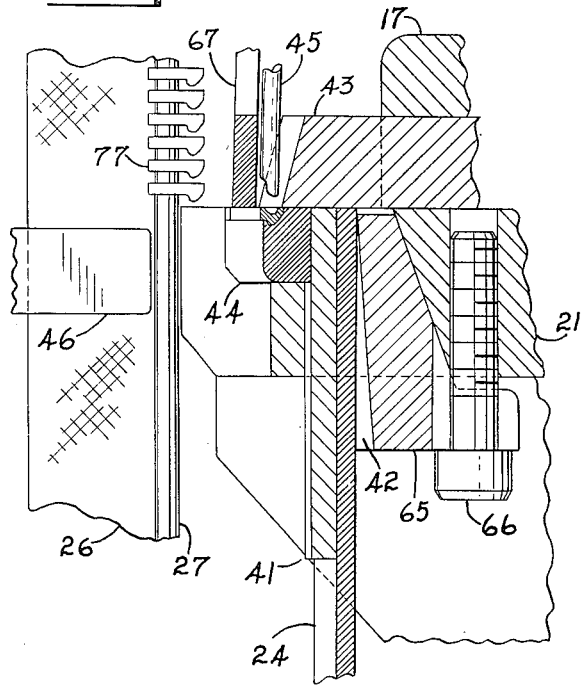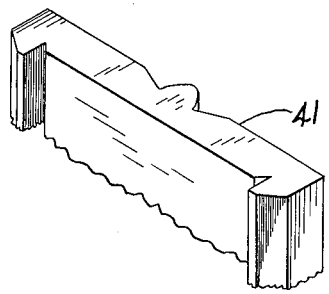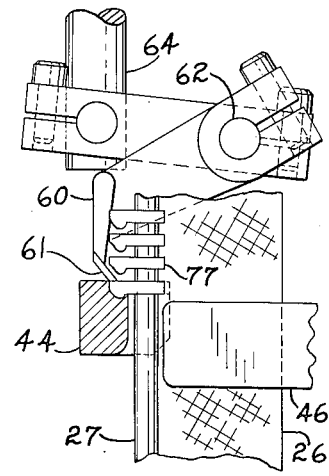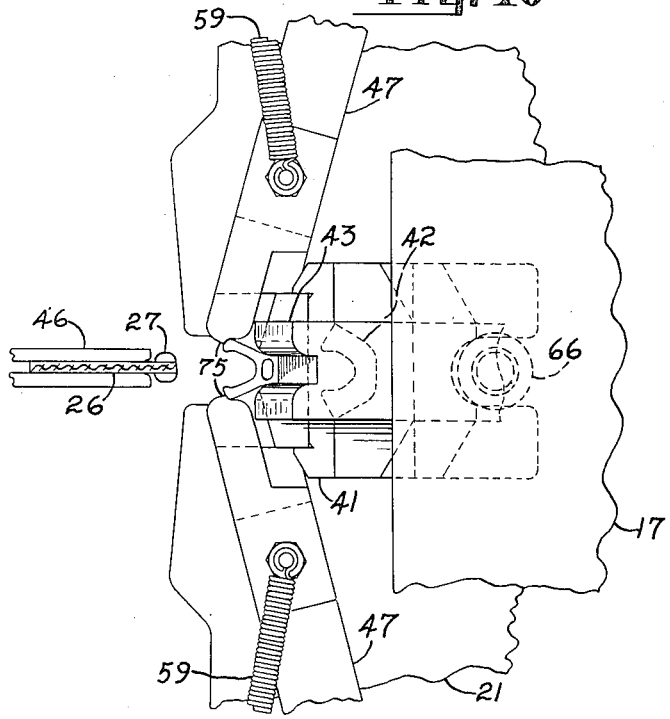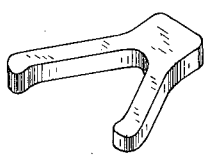

United States Patent Office 2,763,051
Patented Sept. 18, 1956

2,763,051

MACHINE FOR MAKING FASTENER STRINGERS

Osborne Firing, Waterbury, Conn., assignor to Scovill Manufacturing Company, Waterbury, Conn., a specially chartered corporation of Connecticut Application May 11, 1949, Serial No. 92,623

12 Claims. (Cl. 29—34)

My invention relates to the manufacture of slide fastener stringers for zippers of the general type now being marketed. A slide fastener stringer is generally understood to mean a tape with a beaded edge and having a row of closely spaced fastener members clamped around the beaded edge. Each fastener member has legs or jaws to grip the tape and a projecting head which usually has a projection on one side and a recess on the other side. A pair of such stringers provided with a slider and suitable end stops go to make up the well known slide fastener or zipper.

During recent years there has been considerable development in machines for manufacturing slide fastener stringers based on the so-called strip method wherein the formation of the fastener member heads is accomplished in a narrow flat metal strip before they are severed from the strip. They are then carried by the strip to a punching and attaching mechanism. The requirements of the steps involved in this method of manufacture were such that they readily lent themselves to high speed machines, but the resulting product has not been altogether satisfactory because of the limitations placed upon the shape of the fastener member head due to the inherent nature of the process.

According to another method the fastener member blanks are sheared or sliced from the end of a wire which has been previously rolled to a cross section of generally Y-shape. While this method provides a better opportunity to shape the fastener member head correctly with a deeper pocket and higher projection and with a beveled front guiding face, it has presented a real problem in the design of a sufficiently simple and high speed machine.

The primary object of my invention is to provide a machine for the manufacture of such fastener stringers according to the best method, that is, including slicing the blanks from a Y-section wire, which is simple in design and construction and capable of operating at the high speeds comparable to those employing the strip method.

Another object of my invention is to provide a machine which will form more accurate and uniform fastener members and which will set them on the tape in more nearly perfect alignment and spaced relation.

Another object is to provide a machine of this nature having a minimum number of wear parts, easily and cheaply replaceable and capable of automatic operation with a minimum of attention.

In the place of complicated dials, multiple slides or the like, heretofore employed for forming and transferring the fastener members, my conception involves only a single simple slide movement of very short stroke as the heart of the machine, which slide movement accomplishes the slicing off of the blank from the wire, the holding of the blank during its formation in the die which itself is carried by the slide, the transfer of the formed fastener member to the tape and the holding of the member while it is being clamped on the tape.

In one of its aspects my invention comprises improved means for forming the fastener member head and especially for holding it firmly while being formed.

Another aspect of my invention is improved means for fastening or clamping the fastener members on the tape involving a novel arrangement of clamping tools or closing jaws, and also a novel means for holding the fastener member firmly in its proper position while it is being clamped.

In still another aspect my invention includes the mounting of the closing jaws so as to move bodily with the cutoff slide, in combination with a means to operate the closing jaws transversely relative to the slide to clamp the legs of the fastener member to the tape. The closing jaws themselves are utilized in a novel manner to hold the legs of the fastener member during the die forming of the head thus preventing any distortion of the legs during such die forming.

Other objects and advantages of my invention will hereinafter more fully appear.

In the accompanying drawings I have shown for purposes of illustration one embodiment which my invention may assume in practice.

In these drawings:

Fig. 6 is a partial front elevation.

Fig. 7 is a diagrammatic view illustrating the operation of some of the important working parts.

Fig. 8 is a diagrammatic view illustrating the association of most of the principal working mechanisms.

Fig. 9 is a vertical longitudinal central section of the front portion of the slide unit on an enlarged scale showing the position of the parts just after the die forming of the head.

Fig. 10 is a partial plan view on an enlarged scale with the parts in the same position as Fig. 9.

Fig. 11 is a perspective view of the upper end of the cutoff or shearing blade.

Fig. 12 is a perspective view showing the cut slice or fastener member blank, and Fig. 13 is a detail view showing the operation of the holddown arm.

Figure 1:
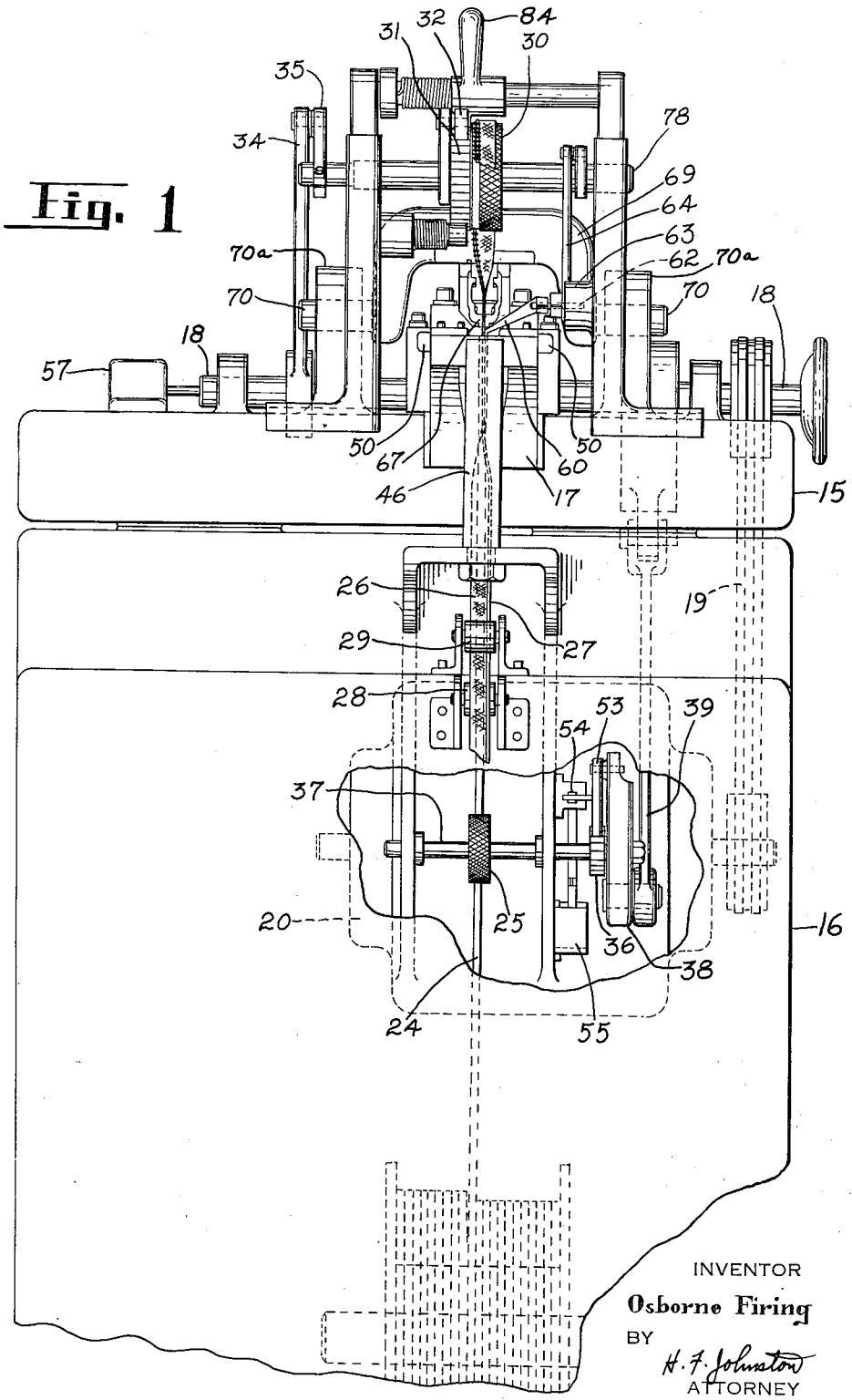
Fig. 1 is a front elevation of a machine embodying my invention.

In general construction the machine illustrated in the drawings has a stationary base frame or support 16 carrying a bed plate 15 to which is bolted a slide housing 17. The main shaft 18 is mounted in suitable bearings and driven by belt 19 from an electric motor 20 suitably supported in the base frame.

The general operation can perhaps be understood more easily by reference to the schematic or diagrammatic illustration in Fig. 8.

The main slide 21 is reciprocated by means of a cam or eccentric 22 keyed to the main shaft 18 and engaging follower lugs 23 on the slide 21.

The metal wire 24 which has been previously rolled to the desired cross section, best shown in the cut section in Fig. 12 and sometimes referred to as Y-shape, is intermittently fed upwardly by feed rolls 25 through a hole in the cutoff slide 21. The feed rolls 25 are spaced a sufficient distance below the slide 21 so that the end of the wire which projects through the slide can move freely back and forth with the slide.

The tape 26 to which the fastener members are to be attached has the usual beaded edge 27 and is guided about suitable tension rolls 28 and 29. The tape 26 is fed upwardly in front of the main slide 21 by means of a tape feed roll 30 located above said slide. The tape feeding mechanism may be of any known construction and since it does not, per se, comprise a part of my invention it need not be described in detail. It will be understood that a suitable spring pressed shoe keeps the tape in contact with the drum so that it can be positively fed. The tape feed roll 30 is intermittently rotated by ratchet 31 and pawl 32 from an eccentric 33 on the main shaft. Motion is transmitted from the eccentric 33 to the feed roll shaft 78 through levers 34 and 35.

Figure 2:
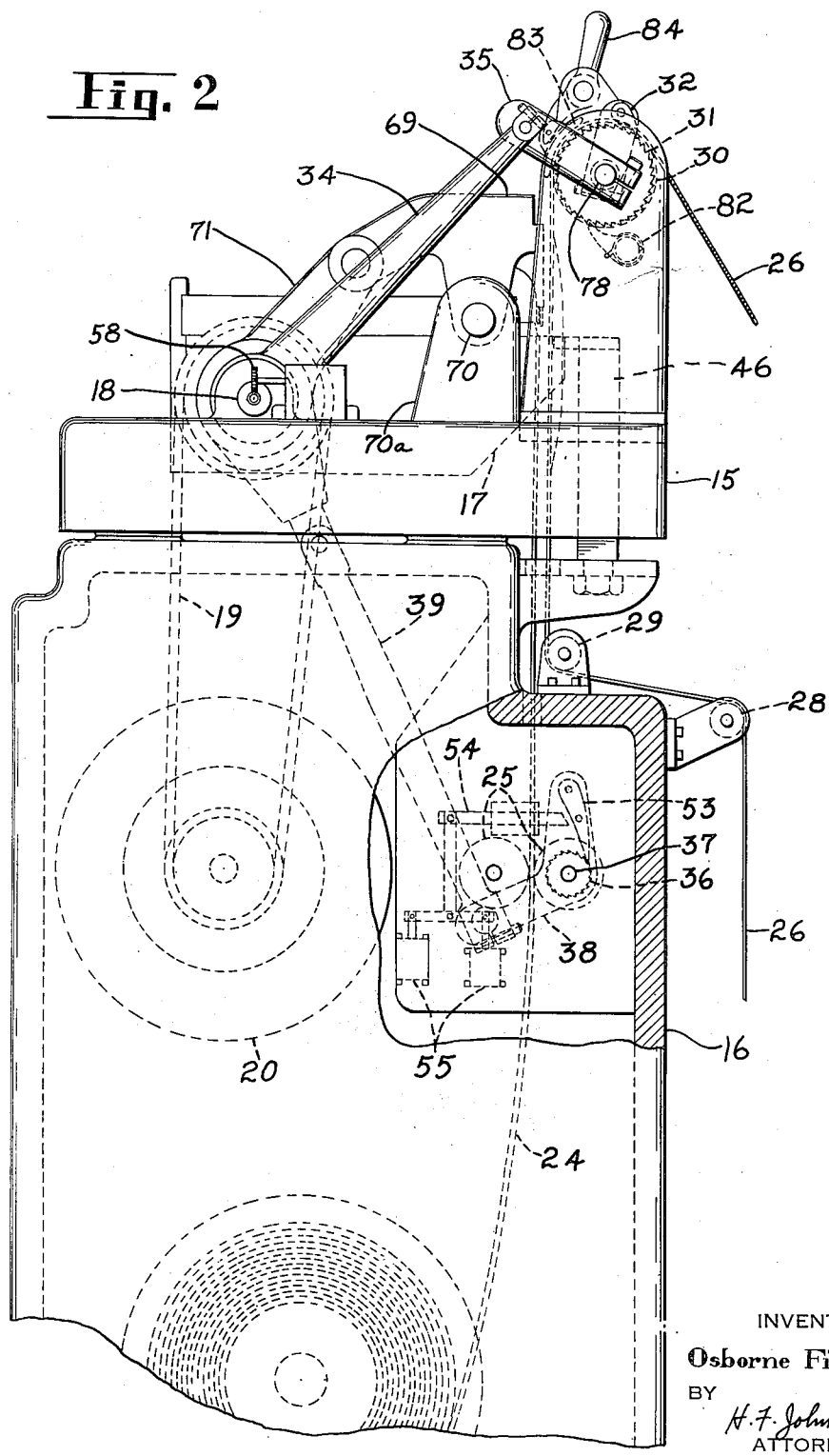
Fig. 2 is a left side elevation as viewed in Fig. 1 with portions cut away.

The mechanism for feeding the metal wire 24 also may be of any known design and as shown in Figs. 2 and 8 may make use of a ratchet and pawl device 36 connected to one of the wire feed roll shafts 37 and actuated through levers 38 and 39 from a suitable eccentric 40 on the main shaft.

The slide 21 carries a shearing or cutoff blade 41 mounted adjacent the hole 42 through which the wire 24 is fed. The end of the wire 24 is pulled underneath the stationary shearing block or knife 43 to slice off a section of the wire which has been previously fed upwardly the required distance through the hole 42 adjacent the cutoff blade 41.

The slide 21 carries a forming die 44 which moves underneath the cut slice or blank when the slide 21 moves to the right as seen in Fig. 8. At this position and during a dwell of the slide provided by suitable design of the cam 22, the forming punch 45 descends to form the recess on one side of the fastener member head and push the metal into the cavity of die 44 to form the projection on the head.

When the slide moves forward after the element is formed it carries the fastener member astride the beaded edge 27 of the tape 26 which is held firmly in position by the tape holder or guide 46.

Figure 3:
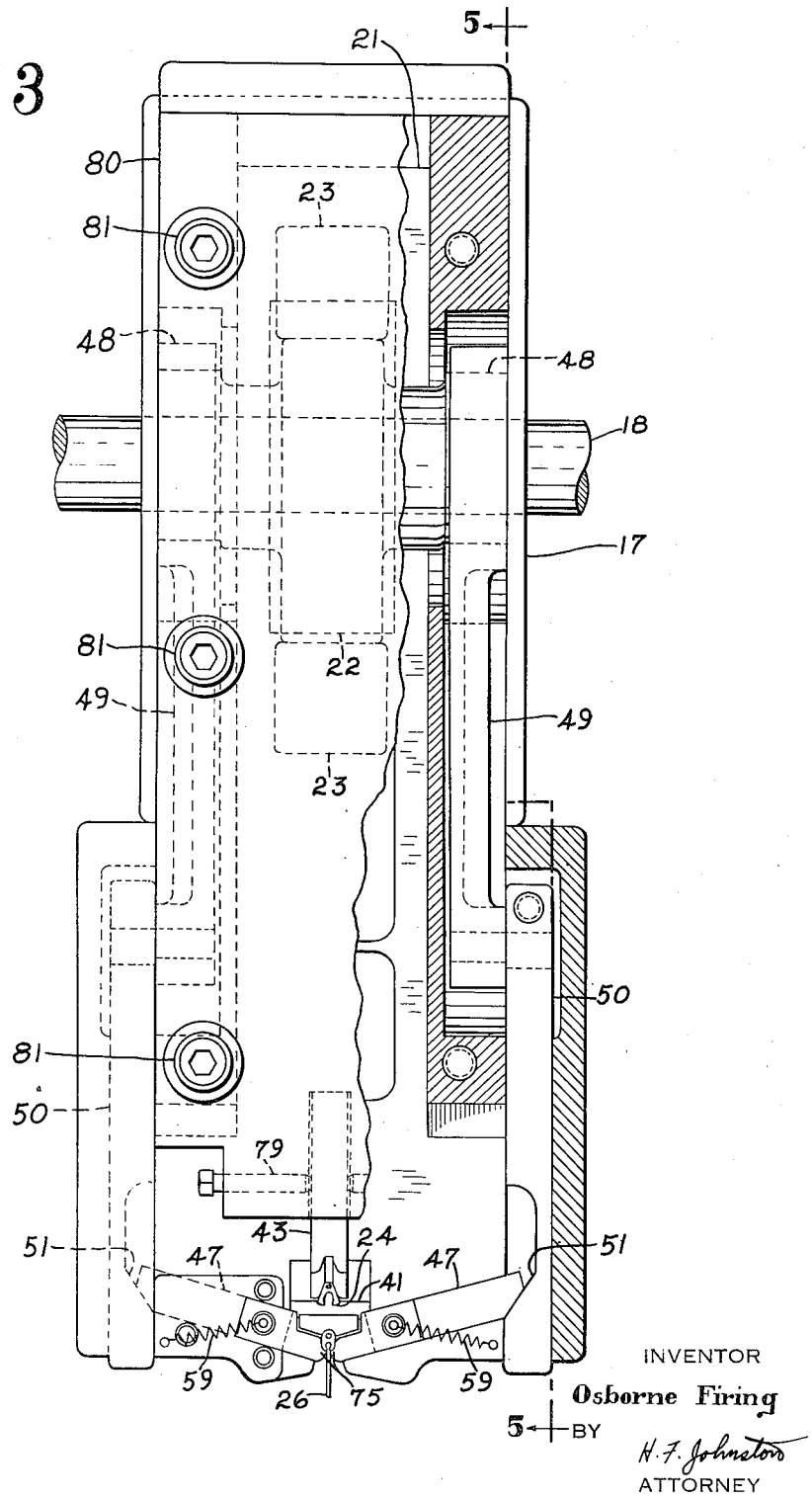
Fig. 3 is a partial plan view with top portions broken away to facilitate illustration.

The slide carries the closing jaws or clamping tools 47 and while the slide is at the forward end of its travel, with the fastener member jaws astride the tape and while still being held in the die 44, the closing jaws are pushed inwardly to bend the legs of the fastener member around the beaded edge of the tape. The mechanism for accomplishing this purpose may be driven from the main shaft 18 by eccentrics 48, links 49 and slide bars 50, each having an angular cam surface 51 for engagement with a corresponding surface on the end of each closing jaw as best shown in Figs. 3 and 7. The eccentrics 48 are designed to pull the slide bars 50 to the right as seen in Fig. 8 during a dwell at the end of the forward stroke of the main slide 21.

The actuation of the punch 45 is from an eccentric 52, also on the main shaft through mechanism which will be described in more detail.

As is well understood in making fastener stringers it is desirable to attach the fastener members in close uniformly spaced relationship until a group of the desired length is produced and then to leave a gap on the tape so that the groups can be later cut apart. Any suitable device can be used to accomplish this purpose so far as my present invention is concerned. In Fig. 8 I have illustrated diagrammatically one scheme that may be employed to obtain this result. The pawl 53 which actuates the metal fed ratchet 36 has connection through a slide link 54 with suitable solenoids 55 so that when one of them is energized it will hold the pawl out of engagement with the ratchet 36 and when the other is energized it will move the slide link 54 to a position which will allow the pawl to engage the ratchet. The energization of the solenoids is controlled through circuit connections 56 by a counter 57 driven from the main shaft 18 by gearing 58. The design and functioning of these parts is well known in the art and need not be further described.

The diagrammatic view, Fig. 7, shows some of the working parts on larger scale and also the operation of additional working parts all shown in the extreme forward position of the slide during the clamping of the fastener members on the tape by the closing jaws 47. The closing jaws are retracted by suitable springs 59 connected between suitable posts on the jaws and on the main slide 21. It will here be seen that the wire 24 has been fed upwardly through the slide the required distance for shearing of a single element by the stationary knife 43 which is suitably mounted in the housing 17.

During the clamping of the fastener member on the tape its head end is held down by a holddown arm 60 whose end 61 engages the head end of the fastener member. This prevents distortion or displacement of the fastener member during the clamping operation. It is, of course, necessary to have the holddown arm 60 move out of the way after the member is clamped so that the tape with its attached member can be fed upwardly and to lift or eject the fastener member from the die. For this purpose the arm 60 is keyed to a shaft 62 pivoted in a block 63 and actuated by a link 64 from the feed roll shaft 78.

A more detailed consideration of the more important working parts requires an examination of the other views and the reference numerals applied to the schematic view are used where they apply to corresponding parts in the other views. Figs. 9 and 10 show the position of the parts when the slide 21 is at the rear end of its travel or to the right as viewed in these figures during the dwell of the slide in this position and just after the die forming of the fastener member head. The shape of the die 44 and cutoff blade 41 are evident from these figures, and those parts are held in place in the main slide 21 by a wedge block 65 adjusted by cap screws 66 to clamp the cutoff blade and die firmly in position.

Figure 4:
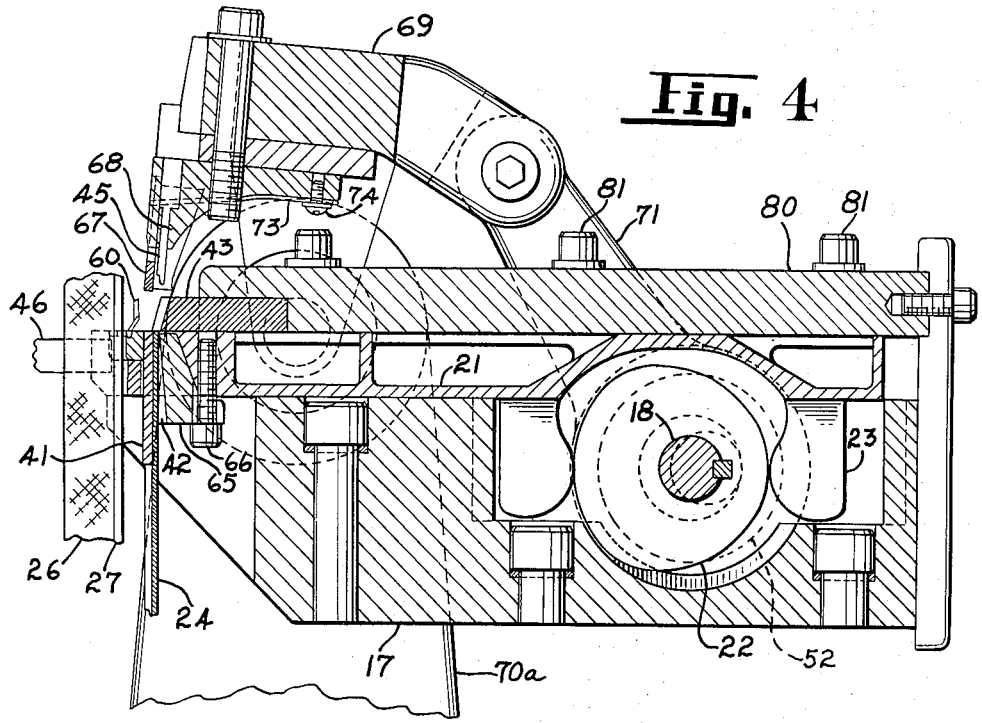
Fig. 4 is a partial vertical section taken along the center line of Fig. 3.
Figure 5:
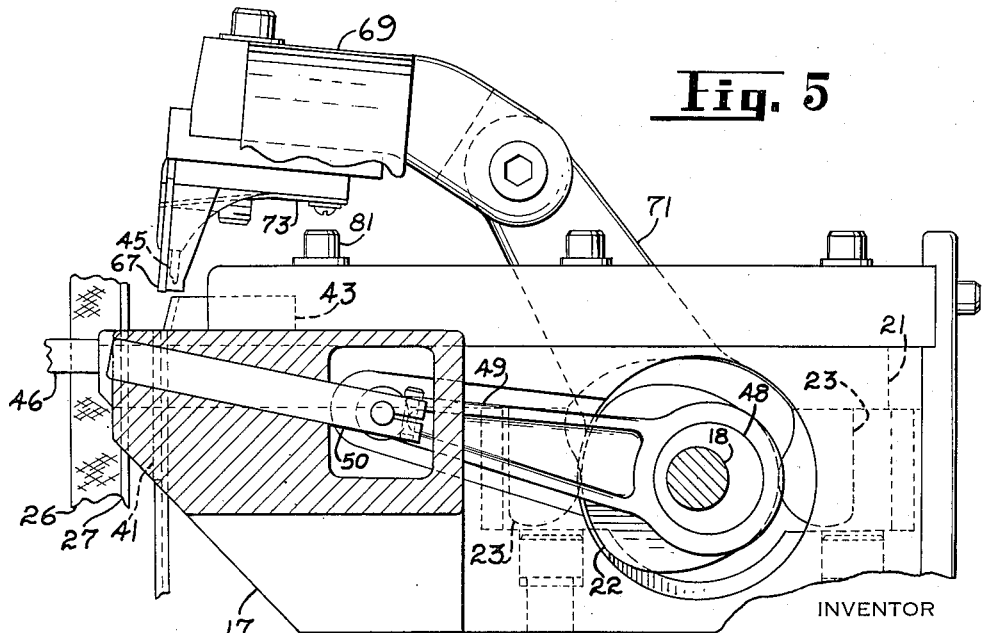
Fig. 5 is a vertical section on line 5—5 of Fig. 3.

The holddown device 67 is slidably mounted in the punch holder so as to have a lost motion connection therewith and when the punch is at the upper limit of its travel the holddown device is lifted free of the formed fastener member. As soon as the die moves under the cut blank, the blank drops into the die and the holddown device 67 will engage the blank to hold it in the die. The end of the holddown device 67 as shown in Fig. 9 is still in engagement with the leg end of the fastener member legs after the punch 45 has partially retracted. This holddown device serves to prevent tilting or malforming of the fastener member when the punch is working on the metal and, furthermore, holds the fastener member in the die to insure that it will not be lifted out upon withdrawal of the punch 54. The mounting of this holddown device 67 and punch 45 is best seen in Figs. 4 and 6. The punch 45 is adjustably held firmly in a holder 68 bolted to a yoke 69 which straddles the slide 21 and is carried on stud shafts 70 mounted in bearings 70a supported on the bed plate. The yoke 69 is oscillated in the bearings 70a by means of the link 71 pivotally connected to a rearward extension on the yoke 69 and an eccentric 52 on the main shaft 18. This mechanism moves the punch and holddown device in an arcuate path but during the short movement while it is working on the metal it may be regarded as working substantially vertically.

To provide the lost motion connection for the holddown device 67 a U-shaped spring 73 fastened to the punch holder 68 by screws 74 has its ends bearing on the hold-down device 67 to urge it downwardly. Thus when the punch 45 swings into working position the holddown device 67 engages the fastener member prior to said punch to force it firmly into the die 44 and holds it during the final working stroke and for the initial part of the withdrawal of the punch. During this time also it should be noted, as seen in Fig. 10, that the closing jaws 47 are in contact with the ends of the fastener member. Obviously suitable means may be provided to limit the retracting movement of the closing jaws so that they will be in contact with the fastener members throughout the movement of the slide. For this purpose the closing jaws have extensions 75 adapted to fit around the ends of the fastener member legs. Thus these parts not only serve as closing jaws but also as retaining means to prevent endwise deformation of the legs during the formation of the head and they further serve sufficiently to grip and hold the fastener member after withdrawal of the punch and during its travel toward the tape 26. By positioning the closing jaws at an angle to the slide movement, the ends of the fastener members can be thus confined and kept under control even during the clamping action. As the closing jaws 47 are pushed inwardly by the slide bars 50, the ends of the fastener member legs will swing in an arc and the placement angle of the closing jaws is such as to allow for this arc while maintaining steady contact with the end of the fastener member legs.

As seen in Figs. 7 and 13, the end 61 of holddown arm 60 may be beveled or turned inwardly so that it can swing into position to engage the fastener member which is held in the die while being clamped on the tape without interfering with the fastener members 77 which have been attached to the tape and fed upwardly.

The holddown arm 60 is oscillated by the lever 64 as previously described and this lever can either have suitable connection with the main shaft or preferably with the tape fed roll shaft 78.

The design of the slide housing 17 is best seen in Figs. 3 and 4. The stationary shearing knife 43 is held in place by suitable screws 79 and the main slide is preferably held in place by a removable cover plate 80 secured in position by bolts 81.

The tape feeding mechanism as well as the metal feeding mechanism may take a known form similar to the design shown in Fig. 2. The tape drum advancing pawl is indicated at 32 and the holding pawl at 82. The shoe which holds the tape in contact with the drum is indicated at 83 and may be lifted to allow removal or replacement of the tape by a handle 84.

As the result of my invention, as described by reference to the embodiment shown in the drawings, it will be evident to those skilled in the art that a machine has been provided which will produce slide fastener stringers without compromising on the quality of the finished product, which is capable of continuous automatic operation at relatively high speeds.

The simplicity of the design especially in the employment of a single simple slide movement of relatively short stroke to accomplish all the major functions is of great importance in economy of manufacture and in the initial cost of the machine.

Another advantage of the machine of this invention is the reduction to a minimum of the wear parts and their easy accessibility for repair or replacement, resulting in part at least, from the employment of the simple single slide movement carrying a single die in which all of the fastener members are formed, in which die the fastener members are carried to the tape and held during attachment to the tape.

Other advantages and novel aspects of the invention will be apparent to those skilled in the art. The invention is not limited to the particular embodiment herein shown and described, but embraces each and all of the novel features and combinations defined herein and in the appended claims.

What I claim is:

1. In a machine for making slide fastener stringers, a reciprocating slide having wire guide means extending transversely of the slide travel including a hole through the slide for receiving the end of a Y-section wire, means for reciprocating said slide providing for a dwell or period of rest at one end of the slide travel, a stationary shearing knife mounted adjacent said slide to shear a blank from the wire upon movement of said slide toward said position of rest, a forming die carried by and located on the slide so that when the slide is at said position of rest the die is under said sheared blank, a forming punch mounted over the die and movable toward the die to form said blank in the die during said dwell, said formed fastener member being retained in the die during movement of the slide in the opposite direction after the forming punch is retracted, means for stepwise feeding of said wire through said guide means after the wire is moved clear of said shearing knife by the motion of said slide in the opposite direction into position for the succeeding blank to be sheared, means at the other end of the slide travel for ejecting said formed member from the die, and means for synchronizing the operation of said forming punch, said wire feeding means and said ejecting means with the movements of said slide.

2. In a machine for making slide fastener stringers, a reciprocating slide having wire guide means extending transversely of the slide travel including a hole through the slide for receiving the end of a Y-section wire, means for reciprocating said slide providing for a dwell or period of rest at one end of the slide travel, a stationary shearing knife mounted adjacent said slide to shear a blank from the wire upon movement of said slide toward said position of rest, a forming die carried by and located on the slide so that when the slide is at said position of rest the die is directly under said blank, a forming punch mounted over the die and movable toward the die to form said blank in the die during said dwell, said formed fastener member being retained in the die during movement of the slide in the opposite direction after the forming punch is retracted, means for stepwise feeding of said wire through said guide means after the same is moved clear of said shearing knife by the motion of the slide in said opposite direction into position for the succeeding blank to be sheared, means at the other end of the slide travel for clamping said formed fastener member to a tape, and means for synchronizing the operation of said forming punch, said wire feeding means and said clamping means with the reciprocation of said slide.

3. In a machine for making slide fastener stringers, the combination defined in claim 2 wherein said synchronizing means comprises a rotating shaft and a separate operating connection between said shaft and each said forming punch, said wire feeding means, said clamping means and said slide.

4. In a machine for making slide fastener stringers, a reciprocating slide having wire guide means extending transversely of the slide travel including a hole through the slide for receiving the end of a Y-section wire, means for reciprocating said slide providing for a dwell or period of rest at each end of the slide travel, a stationary shearing knife mounted over the slide to shear a blank from the wire upon movement of said slide toward the first position of rest, a forming die on the slide located so as to be moved with the slide into position to receive the sheared blank when the slide is at said first position of rest, a forming punch mounted over the die and operable to form said blank in the die during the dwell at the first position of rest, said fastener member being moved while in the die when the slide moves in the opposite direction, means for stepwise feeding of said wire through said guide means, after the wire is moved clear of said shearing knife by the motion of the slide in said opposite direction, into position for the succeeding blank to be sheared, means at the end of the slide travel in said opposite direction for clamping the formed fastener member to a tape during the second period of rest of the slide, and means for synchronizing the operation of said forming punch, said wire feeding means and said clamping means with the reciprocation of said slide.

5. In a machine for making slide fastener stringers, the combination defined in claim 4 wherein said clamping means comprises jaw closing members carried by the slide and operating members to operate said closing jaws to clamp the fastener member to the tape.

6. In a machine for making slide fastener stringers, the combination defined in claim 5 wherein said closing jaws are mounted in guideways in said slide, each movable in a straight line against the fastener member, the guideways being at an acute angle to the path of movement of the slide so that they converge toward the center of the slide.

7. In a machine for making slide fastener stringers, a reciprocating slide, a fastener member forming die mounted on the slide and movable thereby between a forming station at one end of the slide travel and an attaching station at the other end of the slide travel, wire holding and guiding means for the end of a Y-section wire comprising a hole through the slide aligned with the die in the direction of the slide travel and located to that side of the die away from said attaching station, wire feeding means operable to feed the end of the wire through said hole a predetermined distance equal to the thickness of a fastener member blank while the slide is at or near the attaching station end of its travel, a stationary shearing knife at the forming station which shears a blank from the projecting end of the wire as the wire is moved by the slide under the shearing knife, said die being located to receive the sheared blank when the slide is at the forming station end of its travel, a forming punch operable to form the blank in said die while the die is at the forming station, means for guiding and feeding a tape so that its edge is presented to the attaching station, and means at said attaching station for clamping the fastener member to the tape when moved by the die to the attaching station.

8. In a machine for making slide fastener stringers, a reciprocable slide having fastener member retaining means including a recess to receive the fastener member head, a tape holder for supporting a tape with its edge adjacent one end of the slide travel, means for stepwise feeding of said tape lengthwise through said holder, means to supply fastener members one by one to said slide by which they are fed in turn with their legs astride the edge of the tape, closing jaws movable into engagement with each of the fastener members in turn to clamp them to the tape while each is supported by said slide, a holddown member movable into the space between the head of the member being attached and the head of the next previously attached member in position to bear against and hold the head of the member which is being attached firmly in said recess on said slide during operation of the closing jaws, and means for moving said holding member out of said space to permit straight endwise feeding movement of the tape with its attached members.

9. In a machine for making slide fastener stringers, a reciprocable slide having fastener member retaining means, means for supplying fastener members with angularly spread legs one by one to said retaining means, a tape guide in front of said slide for supporting a tape with one edge presented between the spread legs of a fastener member at the forward end of the slide travel, closing jaws on opposite sides of the tape guide in lateral alignment with said legs when astride the tape, said jaws having extensions shaped to fit around the ends of said legs, means for mounting said closing jaws including guideways which extend laterally from said tape guide, each at a substantial angle rearwardly from a straight line 180° opposed relation, and means for moving said jaws in said guideways against said fastener member legs to close the legs around the edge of the tape, whereby the leg contacting portions of said jaws have a forward component of movement to compensate for the forward component of movement of the leg ends during the closing operation.

10. In a machine for making slide fastener stringers of the class described, a movable member having a wire holding means carried thereby whereby the end portion of the wire is movable therewith, stationary shearing means arranged opposite said movable member, cutting means carried by said movable member which cooperates with said stationary shearing means to cut blanks from the end of said wire, a forming die carried by said movable member, and means for actuating said movable member whereby the end of the wire is moved relative to said shearing means so as to shear fastener element blanks from the end of said wire and position them in said forming die.

11. In a machine for making slide fastener stringers of the class described, a reciprocable slide, a stationary cutting tool arranged opposite said slide, a forming die carried by said slide, means for feeding a continuous length of stock into the path of travel of said slide, cutting means carried by said slide for moving the end of said stock against said cutting tool and in cooperation therewith to cut fastener element blanks successively from the end of the continuous length of stock and position them in said forming die upon movement of said slide, means for feeding a flexible carrier past the end of said slide, means cooperating with said forming die to die form said blanks in said die so as to provide finished fastener elements, means for moving said slide so as to position the finished fastener elements astride the flexible carrier positioned opposite said slide upon movement of the slide in one direction and to cut a blank from the end of said stock upon movement of the slide in the opposite direction, and means for clamping the fastener elements to said flexible carrier.

12. In a machine for making slide fastener stringers of the class described, a stationary cutting tool for cutting fastener element blanks from the end of a continuous length of stock, a transfer member arranged opposite said cutting tool with which it cooperates, means for feeding a continuous length of stock into the path of said transfer member, a shearing die carried by said transfer member which cooperates with said cutting tool to cut a blank from the end of said stock, a forming die carried by said transfer member, means cooperating with said die to die form said blanks in said die so as to provide finished fastener elements, and means for moving said transfer member together with the end of said stock relative to said cutting tool whereby said cutting tool cuts blanks from the end of said stock and positions the same in said forming die upon movement of said transfer member.

References Cited in the file of this patent

UNITED STATES PATENTS

| Number | Name | Date |
|---|---|---|
| 1,467,015 | Sunbach | Sept. 4, 1923 |
| 1,903,659 | Smith | Apr. 11, 1933 |
| 1,972,329 | Byerlein | Sept. 4, 1934 |
| 2,141,200 | Sundback | Dec. 20, 1938 |
| 2,167,452 | Hanset | July 25, 1939 |
| 2,217,121 | Lindner | Oct. 8, 1940 |
| 2,231,286 | Firing | Feb. 11, 1941 |
| 2,267,783 | Behrens | Dec. 30, 1941 |
| 2,294,253 | Taberlet | Aug. 25, 1942 |
| 2,323,971 | Blackmore et al. | July 13, 1943 |
| 2,335,034 | Winterhalter | Nov. 23, 1943 |
| 2,336,662 | Wintriss | Dec. 14, 1943 |
| 2,338,884 | Ulrich | Jan. 11, 1944 |
| 2,385,836 | Norkin et al. | Oct. 2, 1945 |
| 2,395,473 | Firing | Feb. 26, 1946 |
| 2,396,933 | Voity | Mar. 19, 1946 |
| 2,508,782 | Carlile | May 23, 1950 |